(12) United States Patent
Hershey et al.

(10) Patent No.: US 9,925,456 B1
(45) Date of Patent: Mar. 27, 2018

(54) SINGLE MANIPULATABLE PHYSICAL AND VIRTUAL GAME ASSEMBLY

(71) Applicant: Hasbro, Inc., Pawtucket, RI (US)

(72) Inventors: Melissa Hershey, Providence, RI (US); Arthur Hamling, Franklin, MA (US); Jason Eastman, Cumberland, RI (US); E Daniel Polanek, South Attleboro, MA (US)

(73) Assignee: Hasbro, Inc., Pawtucket, RI (US)

( * ) Notice: Subject to any disclaimer, the term of this patent is extended or adjusted under 35 U.S.C. 154(b) by 180 days.

(21) Appl. No.: 14/689,540

(22) Filed: Apr. 17, 2015

Related U.S. Application Data

(60) Provisional application No. 61/983,566, filed on Apr. 24, 2014.

(51) Int. Cl.
*A63F 13/24* (2014.01)
*A63F 13/2145* (2014.01)
*A63F 13/98* (2014.01)

(52) U.S. Cl.
CPC .......... *A63F 13/2145* (2014.09); *A63F 13/24* (2014.09); *A63F 13/98* (2014.09)

(58) Field of Classification Search
CPC ....... A63F 13/24; A63F 13/98; A63F 13/2145
USPC .......................................................... 463/31
See application file for complete search history.

(56) References Cited

U.S. PATENT DOCUMENTS

| | | | |
|---|---|---|---|
| 4,493,219 A | 1/1985 | Sharp et al. | |
| 5,746,602 A | 5/1998 | Kikinis | |
| 5,752,880 A | 5/1998 | Gabai et al. | |
| 6,022,273 A | 2/2000 | Gabai et al. | |
| 6,075,195 A | 6/2000 | Gabai et al. | |
| 6,149,490 A | 11/2000 | Hampton et al. | |
| 6,160,986 A | 12/2000 | Gabai et al. | |
| 6,184,865 B1 | 2/2001 | Zimmerman et al. | |
| 6,206,745 B1 | 3/2001 | Gabai et al. | |
| 6,290,566 B1 | 9/2001 | Gabai et al. | |
| 6,319,010 B1 | 11/2001 | Kikinis | |
| 6,352,478 B1 | 3/2002 | Gabai et al. | |
| 6,356,867 B1 | 3/2002 | Gabai et al. | |
| 6,368,177 B1 | 4/2002 | Gabai et al. | |
| 6,514,117 B1 | 2/2003 | Hampton et al. | |
| 6,544,098 B1 | 4/2003 | Hampton et al. | |
| 6,773,322 B2 | 8/2004 | Gabai et al. | |
| 6,773,344 B1 | 8/2004 | Gabai et al. | |

(Continued)

FOREIGN PATENT DOCUMENTS

EP 2505239 A1 10/2012

*Primary Examiner* — David L Lewis
*Assistant Examiner* — Shauna-Kay Hall
(74) *Attorney, Agent, or Firm* — Perry Hoffman

(57) ABSTRACT

Apparatuses, systems and methods for game play having a base with a first planar conductive pattern of a plurality of conductive touch points and a programmable electronic device with a touch screen that registers contact with the conductive touch points and outputs location data for where the conductive touch points contact the touch screen surface are disclosed. An application in communication with the touch screen interprets the location data, identifies the base, and, depending on the identity of the base, juxtaposes one or more computer graphics and animations with the base to form a single manipulatable object having co-operable physical and virtual components. A physical object may be movably or spinnably coupled to the base.

20 Claims, 5 Drawing Sheets

(56) References Cited

U.S. PATENT DOCUMENTS

| | | |
|---|---|---|
| 6,959,166 B1 | 10/2005 | Gabai et al. |
| 7,902,840 B2 | 3/2011 | Zachut et al. |
| 7,946,493 B2 | 5/2011 | Havens et al. |
| 7,993,201 B2 | 8/2011 | Matsumoto et al. |
| 8,199,114 B1 | 6/2012 | Jaeger |
| 8,261,992 B2 | 9/2012 | Havens et al. |
| 8,272,945 B2 | 9/2012 | Kelly et al. |
| 8,358,286 B2 | 1/2013 | Cannon |
| 8,368,662 B2 | 2/2013 | Argiro |
| 2004/0248650 A1 | 12/2004 | Colbert et al. |
| 2006/0255149 A1 | 11/2006 | Retter et al. |
| 2006/0256090 A1 | 11/2006 | Huppi |
| 2007/0062852 A1 | 3/2007 | Zachut et al. |
| 2009/0027359 A1 | 1/2009 | Wong et al. |
| 2009/0048020 A1 | 2/2009 | Gruen et al. |
| 2009/0115133 A1 | 5/2009 | Kelly et al. |
| 2009/0118001 A1 | 5/2009 | Kelly et al. |
| 2009/0124379 A1 | 5/2009 | Wells |
| 2009/0131134 A1 | 5/2009 | Baerlocher et al. |
| 2010/0110013 A1* | 5/2010 | Li .................. G06F 3/0202 345/169 |
| 2011/0086692 A1 | 4/2011 | Guziel |
| 2011/0165933 A1 | 7/2011 | Guziel et al. |
| 2011/0227871 A1 | 9/2011 | Cannon |
| 2011/0298721 A1* | 12/2011 | Eldridge ............ G06F 3/041 345/173 |
| 2012/0050198 A1 | 3/2012 | Cannon |
| 2012/0194457 A1 | 8/2012 | Cannon |
| 2012/0244939 A1 | 9/2012 | Braun |
| 2013/0012313 A1 | 1/2013 | Chen |
| 2013/0079139 A1 | 3/2013 | Gray |
| 2013/0093702 A1* | 4/2013 | Argiro ............... G06F 3/041 345/173 |
| 2013/0127911 A1 | 5/2013 | Brown |
| 2013/0130779 A1 | 5/2013 | Gagner et al. |
| 2013/0181927 A1 | 7/2013 | Madonna et al. |

* cited by examiner

SINGLE MANIPULATABLE PHYSICAL AND VIRTUAL GAME ASSEMBLY

FIELD OF THE INVENTION

The present invention relates generally to a game assembly, and more particularly to the combination of physical and virtual components into a single, manipulatable game assembly, such as a die roller or a spin wheel, operable on the touch screen of an electronic device.

BACKGROUND OF THE INVENTION

For centuries, board games have been an extremely popular form of entertainment for people of all ages. These types of games have been designed both for a single player and for competition between two or more players. Many games use a manipulatable assembly during game play. Some of these assemblies have become famous and add to the enjoyment of playing the game. For example, the Pop-O-Matic™ die roller in the Hasbro™ game Trouble™ has acquired its own widespread identity enjoyed by many because of its uniqueness, because of its usefulness for preventing a lost die and cheating, and because of its "POP" sound when pressed and released. In other games, a spin wheel is used. In the Hasbro™ Game of Life™, players travel around the board by spinning a small wheel in the center of the board with spaces numbered 1 through 10 that is embedded into the landscape of the game board. Additionally, such assemblies are used in board games created from television game shows. For example, the famous spin wheel used in the television game show Wheel of Fortune, has been adapted for use in a board game.

During the past few decades, videogames and all types of digital gaming have evolved and become a staple for game players, and, with the advent of personal computing devices, such as home computers, laptop computers, tablet computers, smart phones, home and portable gaming systems, and the like, videogame play and all types of digital gaming are now ubiquitous. As part of the evolution of video and digital gaming, many board games have been adapted for videogame and other digital game play, including those board games that were adapted from television shows. Nevertheless, despite the pervasiveness of videogames and digital gaming, board games have remained popular. As a result of the coexisting popularity of digital gaming and board games, games and toys involving both computer-related and board game play interaction are developing and, accordingly, becoming popular.

Additionally, the booming popularity of tablet computers has produced a corresponding boom in the popularity of board games adapted for devices with touch screens. Likewise, coming full circle, the popularity of board games adapted for devices with touch screens has caused a corresponding increase in the popularity of board games.

The prior art patents and patent applications involving the interaction of physical game pieces and electronic games are varied. For example, mechanical devices used to provide input to a touch screen are known. United States Patent Application No. US 2006/0256090 to Huppi for "Mechanical overlay", published Nov. 16, 2006, discloses mechanical overlays for placement over touch sensing devices that include one or more mechanical actuators that provide touch inputs to the touch sensing device. U.S. Pat. No. 8,199,114 to Jaeger for "Touch sensor control devices", issued Jun. 12, 2012, discloses mechanical devices to enhance the input process for touch screen devices, such as fader tracks with or without fader caps, rotary and fixed knobs, and joysticks that may be removably adhered to a touch screen and used to emulate their respective functions using software interpretation of the touch detections provoked by the devices to carry out the emulations. For fixed knobs, the software application accepts initial inputs and determines the location on the touch screen, and also interprets the geometry of the input strokes as commands for selected controller emulations, such as joystick, fader, knob, or mouse. For emulating a fader controller, the invention provides a touch sensor controller having a longitudinal web that incorporates touch sensor electrodes and conductors.

U.S. Pat. No. 8,368,662 to Argiro for "Actionable-object controller and data-entry attachment for touchscreen-based electronics", issued Feb. 5, 2013, discloses a touchscreen-controller and data-entry ensemble attached conterminously or proximately to a touchscreen device with one or more input ends and one or more output ends with each input end of a unitary conductive element connected to a respective output end and the plurality of output ends, residing in an attachment base, are in a position of contact with or in close proximity to the soft buttons, keys or controller(s) of a touchscreen so that the output ends thus activate the touch-screen when the input ends are manipulated. A base maintains the input and/or output ends in fixed position during use.

United States Patent Application No. US 2013/0181927 to Madonna et al. for "Remote control unit for a programmable multimedia controller", published Jul. 18, 2013, discloses a menuing system with a plurality of selectable options overlaid upon a portion of a video being shown on a display device coupled to a programmable multimedia controller that may be adapted for a touch screen device.

Other prior art patents and applications disclose identifying an object placed on a touch screen and using the object as an input device based on the identification. United States Patent Application Nos. US 2011/0227871 to Cannon for "Electronic device and the input and output of data", published Sep. 22, 2011, US 2012/0050198 to Cannon for "Electronic device and the input and output of data", published Mar. 1, 2012, and US 2012/0194457 to Cannon for "Identifiable object and a system for identifying an object by an electronic device", published Aug. 2, 2012, and U.S. Pat. No. 8,358,286 to Cannon for "Electronic device and the input and output of data", issued Jan. 22, 2013, relates to a system for identifying an object with an electronic device that has a touch screen. The object includes a conductive portion having a first contact member, a second contact member, and a third contact member all engageable with the touch screen, the conductive portion is connected to all three contact members. The third contact member is movably mounted on the object and movable relative to the other two contact members. The first contact member and the second contact member are spaced by a first distance, and the third contact member is spaced from a line connecting the first and second contact members by a second distance so that a user can grasp the object and manipulate it relative to the touch screen so that the object is moved by the user into contact with the touch screen. The electronic device identifies the object. The first distance is used by the electronic device to determine a category of the object and the second distance is used by the electronic device to determine the identity of the object within the category. The electronic device generates a visual output on the touch screen based on the location and the movement of the contact points.

United States Patent Application No. US 2013/0079139 to Gray for "Overlays for touch sensitive screens to simulate buttons or other visually or tactually discernible areas", published Mar. 28, 2013, relates to overlays for use with touch sensitive display that are configured to simulate visually and/or touch discernible areas with the look and feel of actual buttons or activators. The overlay may be placed over the surface of the display to augment its look and/or feel, to enhance its user operability as a touch sensitive display device. The overlay includes one, a plurality, or a pattern of visually and/or touch discernible area(s), and is overlaid on the display device such that the discernible areas are registered with active, touch sensitive regions of the display device so that a user can readily discern the active regions of the display device based on the visually or touch discernible areas overlaid thereon. When an area is touched, an active region corresponding to the area is activated, and an activation signal is generated to trigger execution of a corresponding routine.

Further prior art patents and applications disclose identifying an object placed on a touch screen and using the object to interact further with a virtual environment. United States Patent Application No. US 2007/0062852 to Zachut et al. for "Apparatus for object information and methods of using same", published Mar. 22, 2007, relates to a system for determining information regarding at least one object having a sensor sensitive to capacitive coupling and at least one object adapted to create a capacitive coupling with the sensor when at least one signal is input to the sensor. A detector is adapted to measure at least one output signal of the sensor and the output signal associated with the object is an object information code.

United States Patent Application No. US 2009/0115133 to Kelly et al. for "Game related systems, methods, and articles that combine virtual and physical elements", published May 7, 2009, relates to physical objects employed with a virtual game layout to enhance wager and non-wagered based gaming. Display subsystems may provide a changeable or selectable virtual game layout with demarcations appropriate to a selected game, and a sensor subsystem may detect physical aspects of game related pieces (e.g., playing cards, chips, markers, dice, spinners, tokens, tiles) as well as media (e.g., identity media, financial media). All gaming functions, as well as functions such as ordering food, beverages and services, may occur through interaction with a playing surface.

United States Patent Application No. US 2009/0124379 to Wells for "Transparent card display", published May 14, 2009, relates to interactive gaming tables, such as for wager-based games, that include one or more video displays and that detect and distinguish between various types of physical objects placed on the interactive gaming table. The gaming tables associate a function with a physical object and generate a video display window that is viewable through a transparent portion of the physical object and that includes content associated with the function. A mostly transparent, credit-card sized object designed to be carried by a game player is one example of one type of physical object that can be utilized with the interactive gaming table.

United States Patent Application No. US 2009/0131134 to Baerlocher et al. for "Gaming system having user interface with uploading and downloading capability", published May 21, 2009, relates to a game table having a multiplayer interactive display/input device that enables multiple players to simultaneously play primary or base wagering games and/or secondary or bonus games using the display/input device. The gaming system also enables use of a card that is encoded or encrypted with a tag, such as a radio frequency tag, that the cameras or readers of the game table can detect, and the card interacts with the display/input device of the game table.

European Patent Application No. EP 2505239 to Cartamundi for "A platform for playing variable multi-player games, and a corresponding multi-player game", published Mar. 10, 2012, relates to a platform suitable for playing variable multi-player games using a substrate, at least one interface for receiving dedicated game applications, a touch display with dimensions adapted to enable a plurality of players to simultaneously view and interact with a displayed game board through finger touch, and a processor for monitoring, controlling and guiding progress of a game. The substrate and touch display are composed of flexible materials, and the touch display uses a tactile layer for sensing dedicated game components that are associated with a dedicated game application.

U.S. Pat. No. 8,272,945 to Kelly et al. for "Game related systems, methods, and articles that combine virtual and physical elements", issued Sep. 25, 2012, relates to a networked gaming system with backline wagering that includes a wagering device operable by a first secondary player not participating in a hybrid wagering game to place a number of backline wagers on play of at least one primary participant who participates in the hybrid wagering game. The system further has a hybrid wagering game system with at least one physical element manually manipulatable by at least one primary participant in the hybrid wagering game as part of a hybrid wagering game and not manually manipulatable by any nonparticipant secondary players as part of a hybrid wagering game. The physical element is at least a first game piece without any associated monetary value with which the hybrid wagering game is played. At least one sensor is operable to read identifying information from the physical element received at a participant position during the hybrid wagering game. A display selectively shows at least one virtual element during the hybrid wagering game. The virtual element is a game piece with which the hybrid wagering game is played, and the play of a participant is assessed based at least in part on values associated with the game pieces. A processor is configured to assess the identifying information read by the sensor and to assess the play of the participant based at least in part on the values associated with the first game pieces.

United States Patent Application No. US 2013/0012313 to Chen for "Table computer game device", published Jan. 10, 2013, relates to a game piece that includes conductive touch points that are configured to contact a touch screen of a computing device and register a touch event with the computing device. The game pieces may include an input component that can receive signals from the touch screen device and generate an effect based on the signals. Game pieces may include momentary touch points allowing for variable game play. Game pieces may also have different touch point patterns allowing the touch screen computing device to generate effects or responses based on the touch point pattern of the game piece.

In sum, the prior art discloses the interaction of physical game pieces and virtual components of electronic games, including using mechanical devices to provide input to a touch screen device, identifying an object placed on a touch screen and using the object as an input device based on the identification, and identifying an object placed on a touch screen and using the object to interact further with a virtual environment. However, the prior art does not provide for a physical object with manipulatable mechanical features that is identified by an application on a touch screen device and where, following the identification, the application adds virtual elements to create a single, manipulatable object with both physical and virtual components.

Accordingly, it would be desirable to define apparatuses, systems and methods, such as games on touch screen devices, which recognize and incorporate mechanically manipulatable physical objects into a virtual environment of the game where the application controlling the virtual environment adds virtual components to the physical object to create a single object used in game play. The inventions discussed in connection with the described embodiment address these and other deficiencies of the prior art.

The features and advantages of the present inventions will be explained in or apparent from the following description of the preferred embodiment considered together with the accompanying drawings.

SUMMARY OF THE INVENTION

The present inventions address the deficiencies of the prior art of game assemblies that use a combination of physical and virtual components by combining a mechanically manipulatable physical object with a virtual object in a virtual environment to create a single, manipulatable game assembly, such as a die roller or a spin wheel, operable on the touch screen of an electronic device, which are not known in the prior art. For example, the Pop-O-Matic™ die roller in the Hasbro™ game Trouble™ may be recreated using a physical top having the circular base and the movable clear plastic dome and a virtual bottom having a virtual die and a virtual "popping" mechanism. Thus, if one is playing an electronic game on an electronic device with a touch screen that requires rolling a die, the physical part of the die roller may be placed on the touch screen, recognized by the game application, which adds the die and the "popper" and responds to contact with the clear plastic dome when the dome is depressed by rolling the virtual die. As another example, in the Hasbro™ Game of Life™, the spin wheel, or spinner, may be recreated with both a mechanically manipulatable physical top with a ring-shaped base and a spinnably attached piece that has a pointer and a virtual bottom with a circular number mapping. Thus, if one is playing an electronic game using a wheel similar to that used in the Game of Life™, the physical part of the spin wheel may be placed on the touch screen, recognized by the game application, which adds the circular number mapping around the physical part. In the described embodiments, the physical parts of the die roller and the spinner may be combined into a single piece. A further example includes the physical object being used as a digital stamp or a simulated ink stamp on the touch screen where the physical object may lock into a plurality of positions, each which will produce a different stamp pattern when the physical object is placed onto and pressed into the touch screen. Thus, unlike the prior art, mechanical and virtual elements may be combined into a single game piece and used to add physical manipulation to an electronic game.

More particularly, the present inventions include an apparatus for game play having a base with a first planar conductive pattern of a plurality of conductive touch points and a programmable electronic device with a touch screen that registers contact with the conductive touch points and outputs location data for where the conductive touch points contact the touch screen surface. An application in communication with the touch screen interprets the location data and identifies the base. The application then, depending on the identity of the base, juxtaposes one or more computer graphics and animations with the base to form a single manipulatable object having co-operable physical and virtual components. A physical object may be movably coupled to the base. For example, the base and the physical object may be ring shaped with the physical object spinnably coupled to the base.

Where the physical object is movably coupled to the base, the apparatus may further have a second planar conductive pattern of one or more conductive touch points on the physical object and a spring attached to the base and the physical object. The spring is biased to place the second planar conductive pattern away from the first planar conductive pattern when at rest, and when the physical object is moved against the bias, the first planar conductive pattern and the second planar conductive pattern become coplanar. In one embodiment, the base is ring shaped, the physical object is a transparent hemispheroid with the second planar conductive pattern on the circular edge, and the physical object is coupled so that the circular edge is moveable into the inner edge of the base. This embodiment may be used as a die roller where the computer graphics include a game die that is stationary when the apparatus is at rest and that graphically rolls in an animated fashion when the physical object is moved into the inner portion of the base to where the first planar conductive pattern and the second planar conductive pattern become coplanar and contact the touch screen. In some embodiments, the combined object will make a "popping" sound from the programmable electronic device when the die is rolled.

In other embodiments where the physical object is movably coupled to the base so that the apparatus has a second planar conductive pattern of one or more conductive touch points on the physical object and a spring attached to the base and the physical object as described above. The base and the physical object are ring shaped. The physical object is further spinnably coupled to the base, and the computer graphics and animations include a graphical wheel concentrically juxtaposed with the base and the physical object. This embodiment may further include a computer routine in the application that executes when the physical object is moved so that the first planar conductive pattern and the second planar conductive pattern become coplanar and contact the touch screen.

In further embodiments where the physical object is movably coupled to the base so that the apparatus has a second planar conductive pattern of one or more conductive touch points on the physical object and a spring attached to the base and the physical object as described above, the base is ring shaped and the physical object is further rotatably coupled to the inner edge of the base and partially movable into the inner portion of the base. The portion of the physical object that moves into the inner portion of the base is rounded with the conductive pattern on the circular surface of the rounded portion of the physical object. This embodiment may further include a computer routine in the application that executes when the physical object is moved so that the first planar conductive pattern and the second planar conductive pattern become coplanar and contact the touch screen. In some embodiments, the combined object will make a "spinning" sound from the programmable electronic device when the spin wheel is spun.

These embodiments further include apparatuses with a plurality of positions in which the base and the physical object become interlocked when the physical object is rotated relative to the base and a plurality of computer routines in the application where, for each position, a particular computer routine corresponds and executes when the physical object is moved so that the first planar conductive pattern and the second planar conductive pattern become coplanar and contact the touch screen. In some embodiments, the computer routine causes a computer graphic of a digital stamp to appear on the touch screen within the area defined by the surface of the rounded portion of the base that faces the touch screen. Different digital stamps or simulated ink stamps may be used for each different interlocked position. In some embodiments, the combined object will make a "stamping" sound from the programmable electronic device when the stamp is pressed.

Some embodiments of the present inventions combine the spinnably attached objects and the movably attached objects to include an apparatus for game play having a base with a first planar conductive pattern of a plurality of conductive touch points and a programmable electronic device with a touch screen that registers contact with the conductive touch points and outputs location data for where the conductive touch points contact the touch screen surface. An application in communication with the touch screen interprets the location data and identifies the base. The application then, depending on the identity of the base, juxtaposes one or more computer graphics or animations with the base to form a single manipulatable object having co-operable physical and virtual components. The base is ring shaped and further includes a first physical object that is ring shaped and spinnably coupled to the base and a second physical object having both a second planar conductive pattern of one or more conductive touch points and a first spring attached to the base and the second physical object and biased to place the second planar conductive pattern away from the first planar conductive pattern when at rest and wherein when the second physical object is moved against the bias, the first planar conductive pattern and the second planar conductive pattern become coplanar where the second physical object is a transparent hemispheroid with the second planar conductive pattern on the circular edge and wherein the second physical object is coupled so that the circular edge is moveable into the inner edge of the base. The first physical object may further be movably coupled to the base with a third planar conductive pattern of one or more conductive touch points on the first physical object and a second spring attached to the base and the first physical object and biased to place the third planar conductive pattern away from the first planar conductive pattern when at rest, and, when the first physical object is moved against the bias, the first planar conductive pattern and the third planar conductive pattern become coplanar. A computer routine in the application executes when the first physical object is moved so that the first planar conductive pattern and the third planar conductive pattern become coplanar and contact the touch screen.

Interaction that occurs between the peripheral and the touch screen can also involve animation without or along with the appearance of digital graphics and sounds. For example, when the spinner is placed on a touch screen surface and then spun, animations may be shown on the touch screen. These animations may be around the outer edges of the spinner and also under the clear Pop-O-Matic™ bubble. Animations may be color sequencing or cartoons acting out different events in the Game of Life™ that the player's spin may land on. Animations add excitement and liveliness to the game experience. In some cases, the use of the peripheral will cause a standard digital graphic to appear on screen. For example, when the digital stamper is used on the touch screen a static image may be left below the stamp. Sounds effects could accompany these experiences to enhance user experience.

Described embodiments also include systems for combining a physical component and a virtual component into a single game structure. The physical component has a base with a first planar conductive pattern of a plurality of conductive touch points and a programmable electronic device with a touch screen that registers contact with the conductive touch points and outputs location data for where the conductive touch points contact the touch screen surface. The virtual component has an application in communication with the touch screen that interprets the location data to identify the base and that juxtaposes one or more computer graphics or animations with the base to form a single manipulatable object having co-operable physical and virtual components. The described systems may further include a first physical object movably coupled to the base with a second planar conductive pattern of one or more conductive touch points on the first physical object and a first spring attached to the base and the first physical object and biased to place the second planar conductive pattern away from the first planar conductive pattern when at rest, and, when the first physical object is moved against the bias, the first planar conductive pattern and the second planar conductive pattern become coplanar.

Described systems may also be embodied so that the base and the first physical object are ring shaped and the first physical object is further spinnably coupled to the base. These systems may further include a second physical object having a third planar conductive pattern of one or more conductive touch points and a second spring attached to the base and the second physical object and biased to place the third planar conductive pattern away from the first planar conductive pattern when at rest, and, when the second physical object is moved against the bias, the first planar conductive pattern and the third planar conductive pattern become coplanar. In these systems, a computer routine in the application executes when the second physical object is moved so that the first planar conductive pattern and the third planar conductive pattern become coplanar and contact the touch screen.

Embodiments of the present inventions are also methods of game play that include providing a base with a first planar conductive pattern of a plurality of conductive touch points, providing a programmable electronic device having a touch screen, placing the first planar conductive pattern in contact with the touch screen, registering the contact between first planar conductive pattern and the touch screen, outputting location data from the touch screen for where the conductive touch points contact the touch screen surface, providing an application in communication with the touch screen that inputs and interprets the location data to identify the base, and juxtaposing one or more computer graphics or animations with the base to form a single manipulatable object having co-operable physical and virtual components. These methods may further included coupling a physical object movably to the base, providing a second planar conductive pattern of one or more conductive touch points on the physical object, attaching a spring to the base and the physical object, and biasing the attachment of the physical object to the base to place the second planar conductive pattern away from the first planar conductive pattern when at rest, and, when the physical object is moved against the bias, the first planar conductive pattern and the second planar conductive pattern become coplanar.

BRIEF DESCRIPTION OF THE DRAWINGS

The inventions will now be more particularly described by way of example with reference to the accompanying drawings. Novel features believed characteristic of the inventions are set forth in the claims. The inventions themselves, as well as the preferred mode of use, further objectives, and advantages thereof, are best understood by reference to the following detailed description of the embodiment in conjunction with the accompanying drawings, in which:

DETAILED DESCRIPTION OF THE EMBODIMENTS

The described embodiments are apparatuses, systems and methods that provide game playing devices having both physical and virtual components in a single game playing device. For example, the renowned Pop-O-Matic™ die roller in the Hasbro™ game Trouble™ is recreated with a physical top having a ring shaped base and a clear dome that is depressible into the base and a virtual bottom having a virtual die and a virtual popping surface. This allows the enjoyment provided by the physical Pop-O-Matic™ device in a touch screen based board game. Similarly, a spin wheel, such as that used in the Hasbro™ Game of Life™, may be recreated with a ring shaped base having a spinnably attached ring with a pointer as the physical top and a graphical wheel with identifiable spaces around the base as the bottom. The described embodiments also provide for the combination of the physical tops into a single physical piece. Patterns of conductive touch points on the base are used to identify the physical game piece part when the piece is placed on a touch screen running a game application. Movably coupled parts of the physical portion of the game piece are arranged so a player may move the parts and cause additional patterns of conductive touch points to contact the touch screen and prompt action from the running application, such as a popping noise and a rolling virtual die or a physically spinning wheel slowing to point at a virtual numbered ring.

Figure 1A:
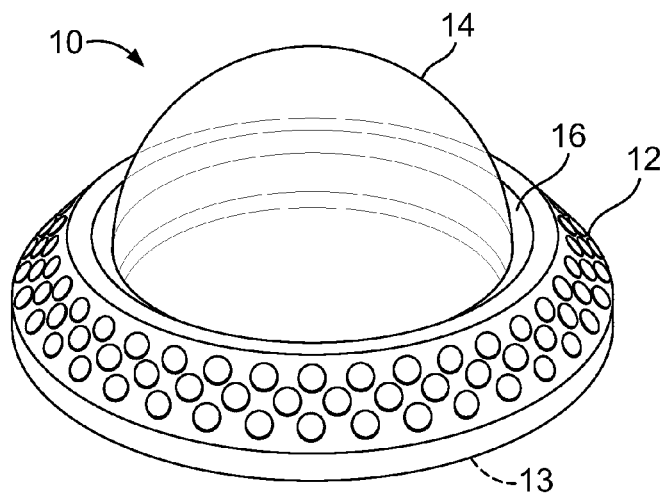
FIG. 1A shows an elevated perspective view of a die roller top.

FIG. 1A shows an elevated perspective view of a die roller top 10. The die roller top 10 includes a ring shaped roller base 12 with a transparent hemispheric dome 14 movably coupled to the roller base 12. When a player presses the transparent hemispheric dome 14, it moves into the roller base 12 so that the circular edge of the hemispheric dome 14 moves into the inner edge of the base 16. The underside of the base 13 has a plurality of conductive touch points arranged in a pattern that may be recognized by an application running on a touch screen device so that the die roller top 10 may be identified. Additionally, the underside of the hemispheric dome 14 may contain a conductive pattern of one or more conductive touch points that contact the touch screen when the hemispheric dome 14 is pressed so that the conductive patterns on the underside of the base 13 and the hemispheric dome 14 contact the touch screen simultaneously and cause the application running on the touch screen device to perform an action.

Figure 1B:
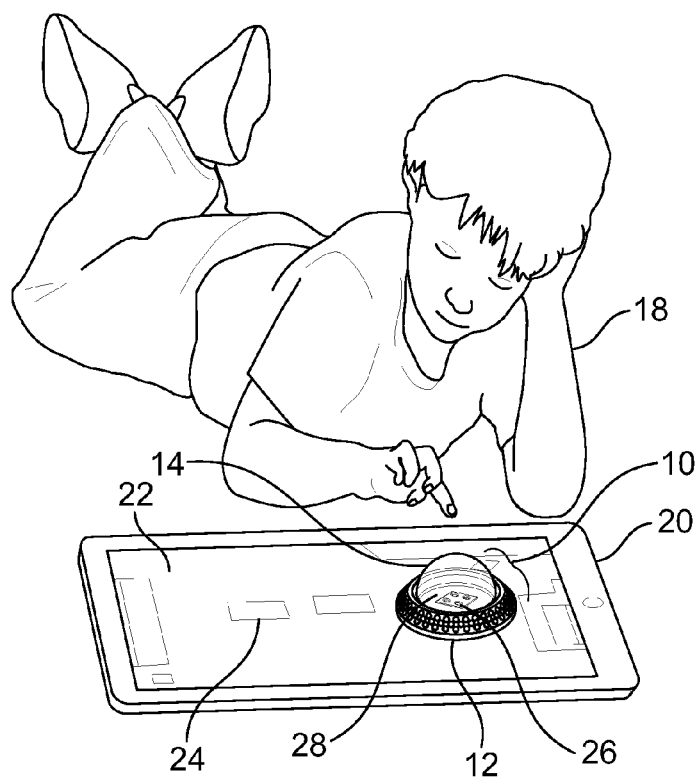
FIG. 1B shows a game player using the die roller top shown in FIG. 1A as a die roller with physical and virtual components during game play.

FIG. 1B shows a game player 18 using the die roller top 10 shown in FIG. 1A as a die roller with physical and virtual components during game play. FIG. 1B shows that the player 18 has placed the die roller top 10 onto the touch screen 22 of a programmable electronic device 20, which may be an iPad™ or some other tablet computer. The application running on the programmable electronic device 20 has produced a digital game board 24 on the touch screen 22 of the programmable electronic device 20 for a board game that involves rolling a die. When placing the die roller top 10 onto the digital game board 24, the conductive pattern on the roller base 12 makes contact with the touch screen 22, and the application running on the programmable electronic device 20 recognizes the die roller top 10 and adds a virtual die 26 and a die roller popping surface 28 in the area of the digital game board 24 viewable through the hemispheric dome 14. When the player 18 presses the hemispheric dome 14, it moves into the roller base 12 and the conductive pattern on the hemispheric dome 14 contacts the touch screen and the application on the programmable electronic device 20 causes the die roller popping surface 28 to simulate movement that causes the virtual die 26 to roll on the digital game board 24. The application may make a popping sound to correspond with the die roller popping surface 28 flexing to roll the virtual die 26. This example demonstrates how the Hasbro™ game Trouble™ may be played on a tablet computer with a described embodiment. Although the Hasbro™ game Trouble™ may be recreated as described, the digital game board 24 may or may not resemble the actual physical game board, and the amount of resemblance, if any, may vary.

Figure 2A:
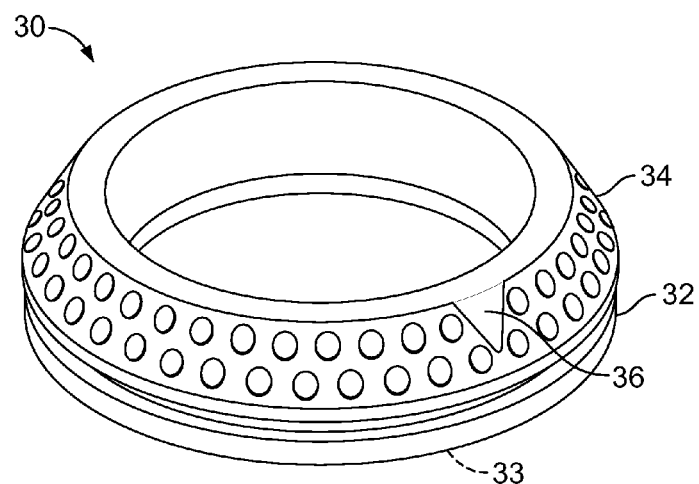
FIG. 2A shows an elevated perspective view of a spin wheel top.

FIG. 2A shows an elevated perspective view of a spin wheel top 30. The spin wheel top 30 includes a ring shaped spinner base 32 with a ring shaped spin wheel 34 spinnably coupled to the spinner base 32. The underside of the base 33 has a plurality of conductive touch points arranged in a pattern that may be recognized by an application running on a touch screen device so that the spin wheel top 30 may be identified. Once the application identifies the spin wheel top 30, the application may place a graphical numbered wheel around the spinner. A spinner pointer 36 is shown on the spin wheel 34 to mark a known position on the spin wheel 34 for alignment with the graphical numbered wheel.

Figure 2B:
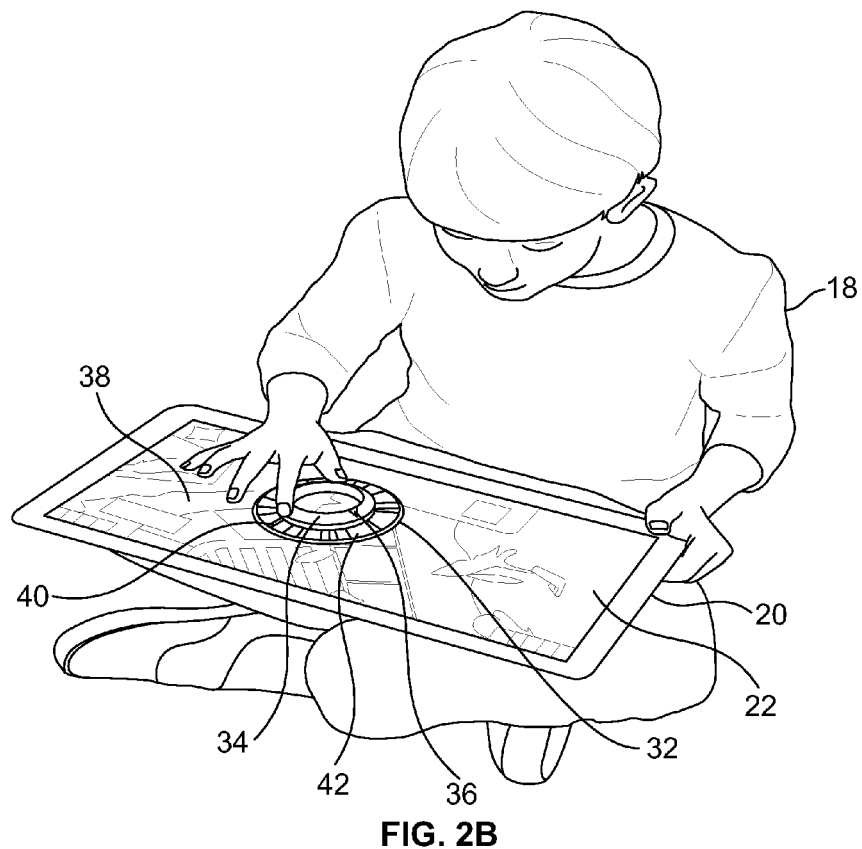
FIG. 2B shows a game player using the spin wheel top shown in FIG. 2A as a spin wheel with physical and virtual components during game play.

FIG. 2B shows a game player 18 using the spin wheel top 30 shown in FIG. 2A as a spin wheel with physical and virtual components during game play. FIG. 2B shows that the player 18 has placed the spin wheel top 30 onto the touch screen 22 of a programmable electronic device 20, which may be an iPad™ or some other tablet computer. The application running on the programmable electronic device 20 has produced a digital game board 38 on the touch screen 22 of the programmable electronic device 20 for a board game that involves a spin wheel. When placing the spin wheel top 30 onto the digital game board 38, the conductive pattern on the spinner base 32 makes contact with the touch screen 22, and the application running on the programmable electronic device 20 recognizes the spinner top 30 and adds a graphical wheel 40 in the area of the digital game board 38 surrounding the spinner top 30. The graphical wheel 40 is sectioned, with each section containing an identifying mark, such as a number or a color. FIG. 2B shows that the spinner pointer 36 is pointing to graphical wheel section 42. Each section in the graphical wheel 40 may mean something relevant for the current game. This example demonstrates how the spinner in the Hasbro™ Game of Life™ may be used on a tablet computer with a described embodiment. Although the Hasbro™ Game of Life™ may be recreated as described, the digital game board 38 may or may not resemble the actual physical game board, and the amount of resemblance, if any, may vary.

In embodiments using a spinner, the spinner may or may not include a pointer on the physical object depending on the desired user experiences from the interaction between the physical toy and digital screen. Some uses will have a better execution with the pointer on the toy where others will work more seamlessly with only a virtual pointer. Examples of use for the pointer on the object include games where the conductive pattern changes as the player moves the spinner and the position of the pointer provides meaningful feedback. Thus, as the player moves the spinner, an image at which the pointer is directed may become highlighted, enlarged or animated. For example, during a game, the spinner may be used as a shooter. The player may use the pointer on the object as reference of where digital assets would shoot out of the spinner. Each time the user pressed down on the spinner a graphic would shoot out from where the pointer is on the spinner.

Examples of use when the pointer is shown digitally and not shown on the physical object include games where a player uses the spinner to select menus. The icon that is currently selected will be enlarge or highlighted. As the user rotates the spinner, the highlighted icon will shift according to the movement of the spinner.

Figure 2C:
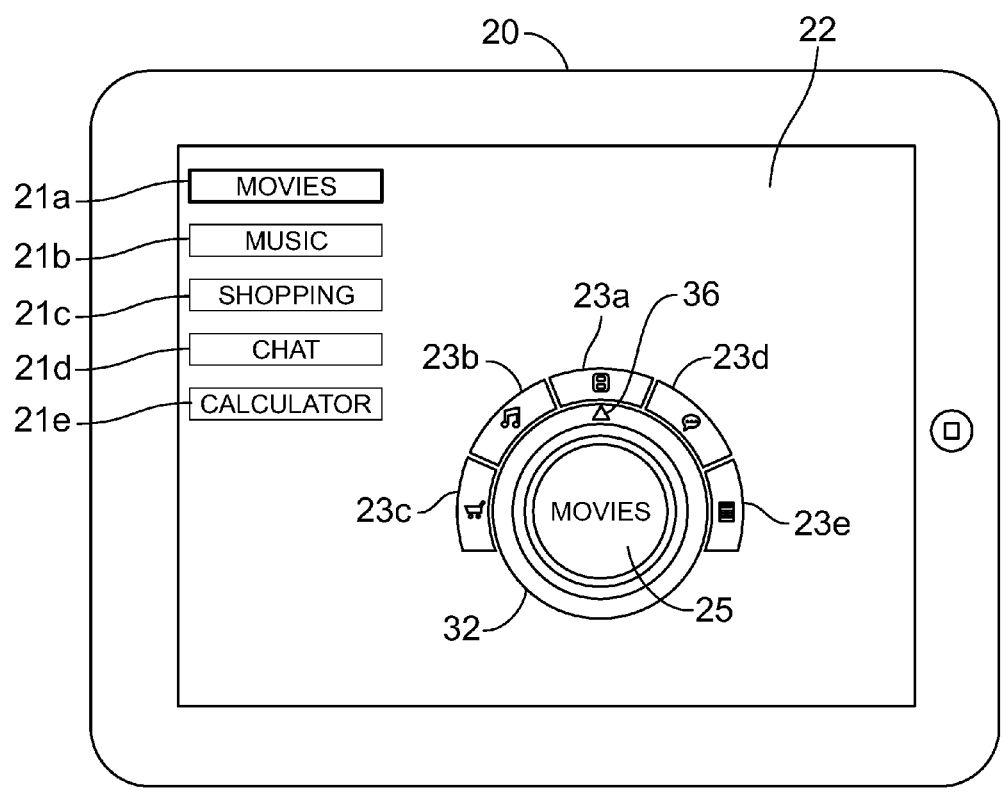
FIG. 2C shows a plan view of the spin wheel used as part of a tablet computer dial-controlled media/activity selection menu.

FIG. 2C shows a plan view of the spin wheel 34 used as part of a programmable electronic device 20 dial-controlled media/activity selection menu 19. In FIG. 2C, the spinner base 32 of the spin wheel 34 has been placed on the touch screen 22 of the programmable electronic device 20. In this example, the programmable electronic device 20 is a tablet computer, although other programmable electronic devices may be used. When the spinner base 32 makes contact with the touch screen 22, the application running on the programmable electronic device 20 produces a dial-controlled media/activity selection menu 19. The media/activity selection menu 19 includes the spin wheel 34, which has a spinner pointer 36 and several media/activity selection graphics 23*a-e*, such as a movies graphic 23*a*, a music graphic 23*b*, a shopping graphic 23*c*, a chat graphic 23*d* and a calculator graphic 23*e*. The area in the center of the spin wheel 34 has a pointer indicator 25 to show where the spinner pointer 36 is pointing. In this example, the spinner pointer 36 is pointing to the movies graphic 23*a*, and the pointer indicator 25 shows that "MOVIES" is selected. The chosen media/activity indicator 21*a-e* indicates which media or activity is currently selected. In this example, the movies indicator 21*a* shows that the user has selected to play movies. The music indicator 21*b*, the shopping indicator 21*c*, the chat indicator 21*d* and the calculator indicator 21*e* show that these media and activities are not selected.

Figure 3:
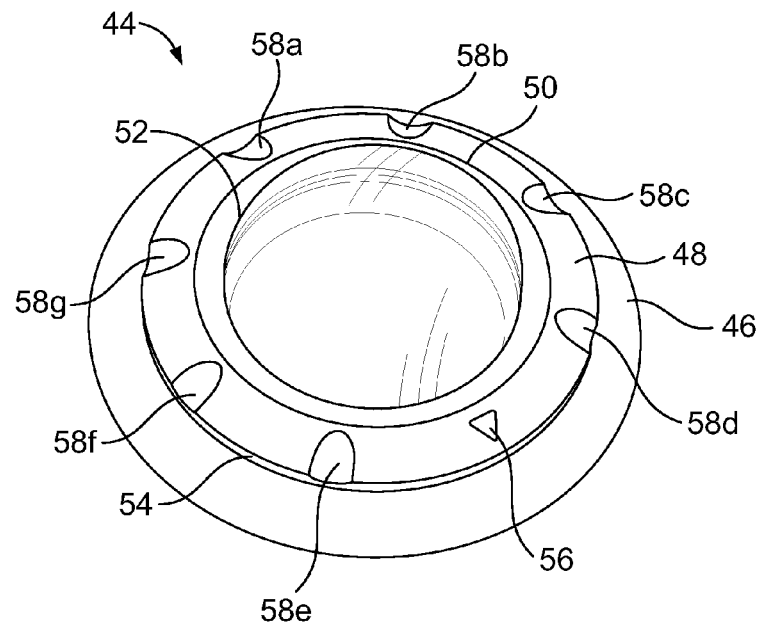
FIG. 3 shows an elevated perspective view of a combination top that has a dual function as the die roller top of FIG. 1A and the spinner top of FIG. 2A.

FIG. 3 shows an elevated perspective view of a combination top 44 that has a dual function as the die roller top 10 of FIG. 1A and the spinner top 30 of FIG. 2A. In this figure, the ring shaped combination base 46 is shown with the ring shaped combination spin wheel 48 and the combination dome 50. The combination spin wheel 48 is mounted onto the combination base 46 so that the combination spin wheel 48 may be pressed into the combination base 46 through the combination spinner gap 54. The combination dome 50 is mounted onto the combination base 46 so that the combination dome 50 may be pressed into the combination base 46 through the combination inner edge of the base 52.

The underside of the combination base 46 has a plurality of conductive touch points arranged in a pattern that may be recognized by an application running on a touch screen device so that the combination top 44 may be identified. Once the application identifies the combination top 44, the application will wait to identify which function of the combination top 44 the player will use. The underside of the combination dome 50 contains a conductive pattern of one or more conductive touch points that contact the touch screen when the combination dome 50 is pressed into the combination inner edge of the base 52 so that the conductive patterns on the underside of the combination base 46 and the combination dome 50 contact the touch screen simultaneously and cause the application running on the touch screen device to perform an action. In a described embodiment, if the player presses the combination dome 50 into the combination inner edge of the base 52, the application "pops" the virtual die.

Similarly, the underside of the combination spin wheel 48 contains a conductive pattern of one or more conductive touch points that contact the touch screen when the combination spin wheel 48 is pressed into the combination spinner gap 54 so that the conductive patterns on the underside of the combination base 46 and the combination spin wheel 48 contact the touch screen simultaneously and cause the application running on the touch screen device to perform an action. In a described embodiment, if the player presses the combination spin wheel 48 into the combination spinner gap 54, the application may place a graphical wheel around the combination base 46. A combination spinner pointer 56 is shown on the combination spin wheel 48 to mark a known position on the combination spin wheel 48 for alignment with the graphical wheel. Then, a player may spin the combination spin wheel 48 during a game so that the combination spinner pointer 56 will land on a section of the graphical wheel that has meaning for the game and proceed accordingly. In the shown figure, finger grips 58*a-g* are shown as aids for spinning the combination spin wheel 48, although other spinning aids may be used.

Figure 4A:
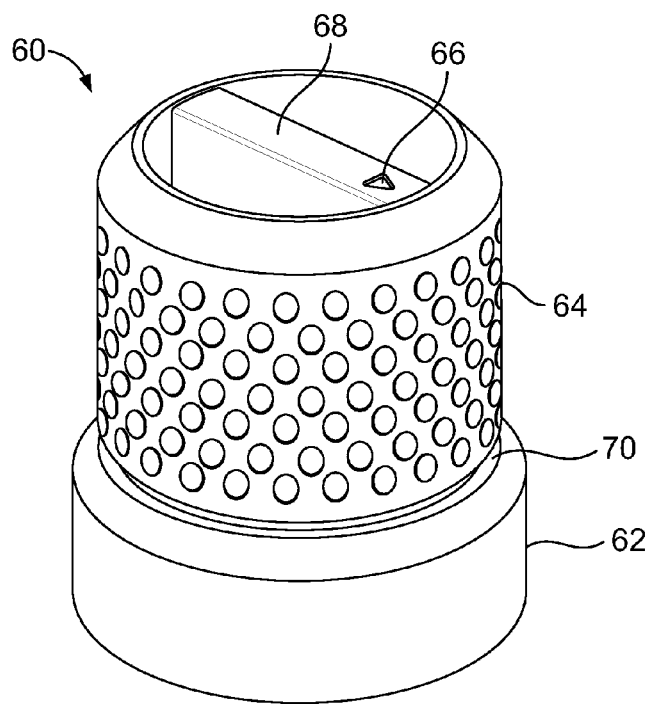
FIG. 4A shows an elevated perspective view of a digital stamp top.

FIG. 4A shows an elevated perspective view of a digital stamp top 60. The digital stamp top 60 includes a ring shaped digital stamp base 62 with a digital stamp grip 64 rotatably coupled to and partially movable into to the inner edge of the base 70 and a plurality of rotatably interlocking positions. When a player presses the digital stamp grip 64, it moves into the digital stamp base 62 so that the digital stamp grip 64 moves into the inner edge of the base 70. The portion of the digital stamp grip 64 that moves into the inner portion of the digital stamp base 62 is rounded with the conductive pattern on the circular surface of the rounded portion of the digital stamp grip 64. The underside of the digital stamp base 62 has a plurality of conductive touch points arranged in a pattern that may be recognized by an application running on a touch screen device so that the digital stamp top 60 may be identified. Additionally, the underside of the digital stamp grip 64 may contain a conductive pattern of one or more conductive touch points that contact the touch screen when the digital stamp grip 64 is pressed so that the conductive patterns on the underside of the digital stamp base 62 and the digital stamp grip 64 contact the touch screen simultaneously and cause the application running on the touch screen device to perform an action.

The digital stamp grip 64 rotates into a plurality of interlocking positions by the player grabbing the digital stamp rotator 68 and rotating the digital stamp grip 64 so that the digital stamp pointer 66 points and locks into the desired position. For each interlocking position, the application may perform a different action.

Figure 4B:
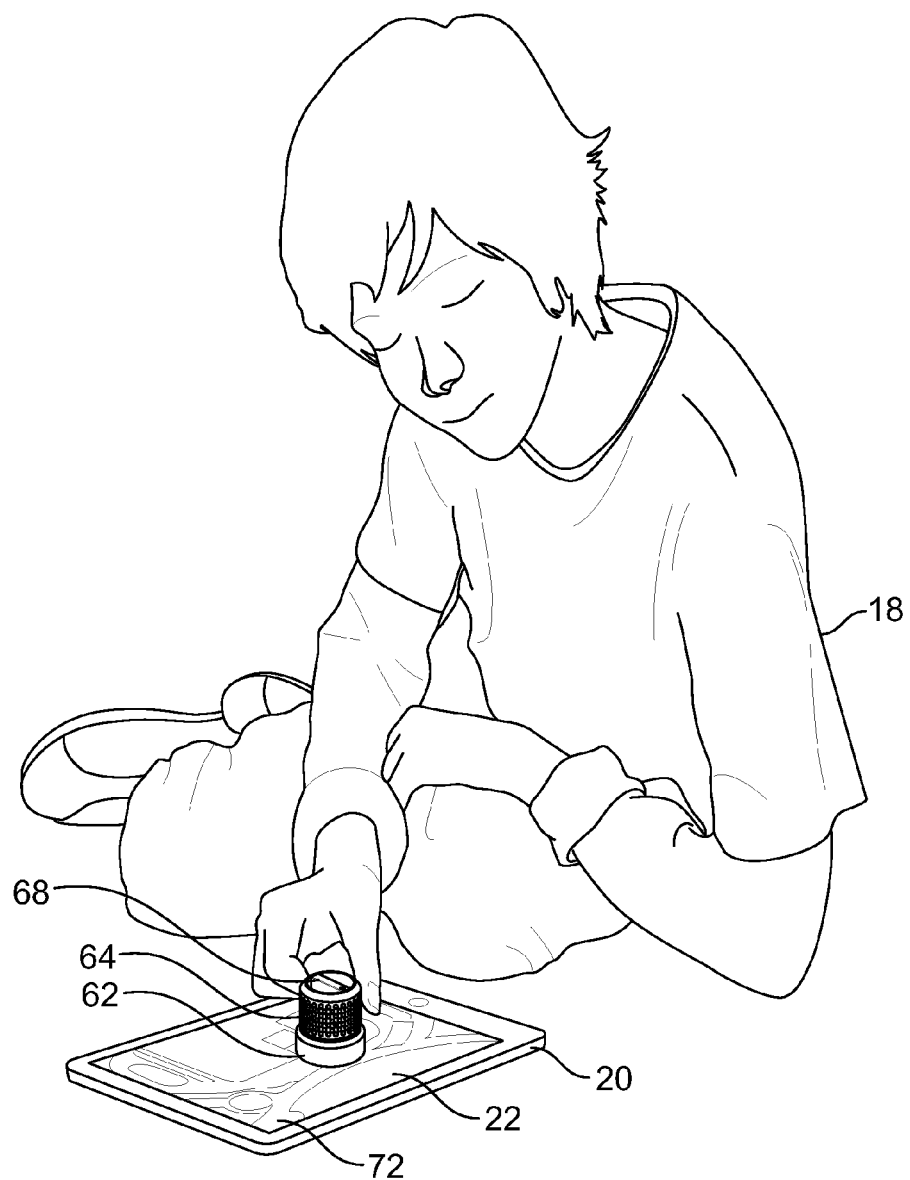
FIG. 4B shows a game player using the digital stamp top shown in FIG. 4A as a digital stamp with physical and virtual components during game play.

FIG. 4B shows a game player 18 using the digital stamp top 60 shown in FIG. 4A as a digital stamp with physical and virtual components during game play. FIG. 4B shows that the player 18 has placed the digital stamp top 60 onto the touch screen 22 of a programmable electronic device 20, which may be an iPad™ or some other tablet computer. The application running on the programmable electronic device 20 has produced a digital stamper digital game board 72 for a board game that involves a digital stamp. When placing the digital stamp top 60 onto the digital stamper digital game board 72, the conductive pattern on the digital stamp base 62 makes contact with the touch screen 22, and the application running on the programmable electronic device 20 recognizes the digital stamp top 60. Once the application identifies the digital stamp top 60, the application will wait to identify which interlocking position of the digital stamp top 44 the player 18 will use.

Once the player 18 uses the digital stamp rotator 68 to select an interlocking position, the player 18 may push down on the digital stamp grip 64 so that the bottom of the digital stamp grip 64 contacts the touch screen 22. Because the underside of the digital stamp grip 64 may contain a conductive pattern of one or more conductive touch points that contact the touch screen when the digital stamp grip 64 is pressed so that the conductive patterns on the underside of the digital stamp base 62 and the digital stamp grip 64 contact the touch screen simultaneously, each combination of conductive touch points from the digital stamp base 62 and the digital stamp grip 64 will have a different orientation and be separately identifiable. Thus, for each interlocked position of the digital stamp grip 64, the application running on the programmable electronic device may perform a different action. In the case of the digital stamp top 60, each interlocked position may cause the application to produce a different digital stamp on the digital stamper digital game board 72.

Sounds will be used to provide feedback for the user as well as to enhance the overall experience. In some cases, the sounds will directly reflect an input or change state from the peripheral. For example, if the spinner is spun, the stamp pushed down or Pop-O-Matic™ bubble pressed, a sound will accompany this action. These noises may be mechanical from the peripheral, electronic from the peripheral or electronic from the programmable electronic device.

The sounds may be mechanical noises made from the physical object itself. The spinner may make a clicking noise similar to the current Game of Life™ spinner in the traditional board game. The stamp could make a mechanical click when it is changed from one state to another.

The sounds may also be electronic noises made from the physical object. In this case, a particular digital stamper could make sounds that correspond to what each stamp pattern is. For example, if a child turns the stamper to the "A" pattern the stamp will make the sound "A" and each time the child stamps it will say "Apple" or "Alligator" or "Ant" etc. If the spinner has an electronic noise, this could be activated when the spinner is spun and audio watermarking of the signature noise could be used to transfer information to the programmable electronic device. Then, the programmable electronic device may produce the sound. This type of audio watermarking communication may similarly control graphic and animation display, as well as other functions, on the programmable electronic device.

The sound may also be electronic but come from the programmable electronic device. In these cases, the conductive pattern recognition would trigger certain audio to play through the device. This allows for a very broad library of sounds to be used in conjunction with the peripheral. These sounds may be updated and changed over time through application updates. The sounds generated may be sound effects, such as a shooting sound for a spinner mini-game, traditional device sounds such as mimicking the Game of Life™ spinner noise, or sounds relating specifically to an action. For example, if the user is stamping in a color program, each time a different stamp pattern is selected and used, the tablet may say "yellow sun" and an icon of the sun will appear, "yellow duck" and a yellow duck will appear, etc. as the appropriate pattern is used.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. An apparatus for game play comprising:
    a base comprising a first planar conductive pattern of a plurality of conductive touch points; and
    a programmable electronic device comprising:
        a touch screen that registers contact with the conductive touch points and outputs location data for where the conductive touch points contact the touch screen surface; and
        an application in communication with the touch screen that interprets the location data to identify the base and that juxtaposes one or more of a computer graphic and an animation with the base to form a single manipulatable object having co-operable physical and virtual components.

2. The apparatus recited in claim 1 further comprising a physical object movably coupled to the base.

3. The apparatus recited in claim 2 wherein the base and the physical object are ring shaped and wherein the physical object is spinnably coupled to the base.

4. The apparatus recited in claim 2 further comprising:
    a second planar conductive pattern of one or more conductive touch points on the physical object; and
    a spring attached to the base and the physical object and biased to place the second planar conductive pattern away from the first planar conductive pattern when at rest and wherein when the physical object is moved against the bias, the first planar conductive pattern and the second planar conductive pattern become coplanar.

5. The apparatus recited in claim 4 wherein the base is ring shaped and the physical object is a transparent hemispheroid with the second planar conductive pattern on the circular edge and wherein the physical object is coupled so that the circular edge is moveable into the inner edge of the base.

6. The apparatus recited in claim 5 wherein the computer graphics comprise a game die that is stationary when the apparatus is at rest and that graphically rolls in an animated fashion when the physical object is moved into the inner portion of the base to where the first planar conductive pattern and the second planar conductive pattern become coplanar and contact the touch screen.

7. The apparatus recited in claim 4 wherein the base and the physical object are ring shaped and the physical object is further spinnably coupled to the base and wherein the one or more of a computer graphic and an animation comprise a graphical wheel concentrically juxtaposed with the base and the physical object.

8. The apparatus recited in claim 7 further comprising a computer routine in the application that executes when the physical object is moved so that the first planar conductive pattern and the second planar conductive pattern become coplanar and contact the touch screen.

9. The apparatus recited in claim 4 wherein the base is ring shaped and the physical object is further rotatably coupled to the inner edge of the base and partially movable into the inner portion of the base and the portion of the physical object that moves into the inner portion of the base is rounded with the conductive pattern on the circular surface of the rounded portion of the physical object.

10. The apparatus recited in claim 9 further comprising a computer routine in the application that executes when the physical object is moved so that the first planar conductive pattern and the second planar conductive pattern become coplanar and contact the touch screen.

11. The apparatus recited in claim 10 further comprising:
a plurality of positions in which the base and the physical object become interlocked when the physical object is rotated relative to the base; and
a plurality of computer routines in the application;
wherein for each position, a particular computer routine corresponds and executes when the physical object is moved so that the first planar conductive pattern and the second planar conductive pattern become coplanar and contact the touch screen.

12. The apparatus recited in claim 11 wherein each of the plurality of computer routines causes one of a plurality of computer graphics of digital stamps to appear on the touch screen within the area defined by the surface of the rounded portion of the base that faces the touch screen.

13. The apparatus recited in claim 10 wherein the computer routine causes a computer graphic of a digital stamp to appear on the touch screen within the area defined by the surface of the rounded portion of the base that faces the touch screen.

14. The apparatus recited in claim 1 wherein the base is ring shaped and further comprising:
a first physical object that is ring shaped and spinnably coupled to the base; and
a second physical object comprising:
a second planar conductive pattern of one or more conductive touch points; and
a first spring attached to the base and the second physical object and biased to place the second planar conductive pattern away from the first planar conductive pattern when at rest and wherein when the second physical object is moved against the bias, the first planar conductive pattern and the second planar conductive pattern become coplanar;
wherein the second physical object is a transparent hemispheroid with the second conductive pattern on the circular edge and wherein the second physical object is coupled so that the circular edge is moveable into the inner edge of the base.

15. The apparatus recited in claim 14 wherein the first physical object is further movably coupled to the base further comprising:
a third planar conductive pattern of one or more conductive touch points on the first physical object;
a second spring attached to the base and the first physical object and biased to place the third planar conductive pattern away from the first planar conductive pattern when at rest and wherein when the first physical object is moved against the bias, the first planar conductive pattern and the third planar conductive pattern become coplanar; and
a computer routine in the application that executes when the first physical object is moved so that the first planar conductive pattern and the third planar conductive pattern become coplanar and contact the touch screen.

16. A system for combining a physical component and a virtual component into a single game structure comprising:
a physical component comprising:
a base comprising a first planar conductive pattern of a plurality of conductive touch points; and
a programmable electronic device comprising a touch screen that registers contact with the conductive touch points and outputs location data for where the conductive touch points contact the touch screen surface; and
a virtual component comprising:
an application in communication with the touch screen that interprets the location data to identify the base and that juxtaposes one or more of a computer graphic and an animation with the base to form a single manipulatable object having co-operable physical and virtual components.

17. The system recited in claim 16 further comprising a first physical object movably coupled to the base comprising:
a second planar conductive pattern of one or more conductive touch points on the first physical object; and
a first spring attached to the base and the first physical object and biased to place the second planar conductive pattern away from the first planar conductive pattern when at rest and wherein when the first physical object is moved against the bias, the first planar conductive pattern and the second planar conductive pattern become coplanar.

18. The system recited in claim 17 wherein the base and the first physical object are ring shaped and the first physical object is further spinnably coupled to the base further comprising:
a second physical object comprising:
a third planar conductive pattern of one or more conductive touch points; and
a second spring attached to the base and the second physical object and biased to place the third planar conductive pattern away from the first planar conductive pattern when at rest and wherein when the second physical object is moved against the bias, the first planar conductive pattern and the third planar conductive pattern become coplanar; and
a computer routine in the application that executes when the second physical object is moved so that the first planar conductive pattern and the third planar conductive pattern become coplanar and contact the touch screen.

19. A method of game play comprising:
providing a base comprising a first planar conductive pattern of a plurality of conductive touch points;
providing a programmable electronic device comprising a touch screen;
placing the first planar conductive pattern in contact with the touch screen;
registering the contact between first planar conductive pattern and the touch screen;
outputting location data from the touch screen for where the conductive touch points contact the touch screen surface;
providing an application in communication with the touch screen that inputs and interprets the location data to identify the base; and
juxtaposing one or more of a computer graphic and an animation with the base to form a single manipulatable object having co-operable physical and virtual components.

20. The method recited in claim 19 further comprising:
coupling a physical object movably to the base;
providing a second planar conductive pattern of one or more conductive touch points on the physical object;
attaching a spring to the base and the physical object; and
biasing the attachment of the physical object to the base to place the second planar conductive pattern away from the first planar conductive pattern when at rest and wherein when the physical object is moved against the bias, the first planar conductive pattern and the second planar conductive pattern become coplanar.

* * * * *